(12) United States Patent
Low et al.

(10) Patent No.: US 9,325,811 B2
(45) Date of Patent: Apr. 26, 2016

(54) METHOD AND SYSTEM FOR PACKET PROCESSING

(71) Applicant: Conversant Intellectual Property Management Inc., Ottawa (CA)

(72) Inventors: Arthur John Low, Chelsea (CA); Stephen J. Davis, Ottawa (CA)

(73) Assignee: Conversant Intellectual Property Management Inc., Ottawa (CA)

( * ) Notice: Subject to any disclaimer, the term of this patent is extended or adjusted under 35 U.S.C. 154(b) by 0 days.

(21) Appl. No.: 14/148,895

(22) Filed: Jan. 7, 2014

(65) Prior Publication Data

US 2014/0122582 A1   May 1, 2014

Related U.S. Application Data

(60) Division of application No. 12/619,355, filed on Nov. 16, 2009, now Pat. No. 8,639,912, which is a continuation of application No. 11/257,525, filed on Oct. 25, 2005, now Pat. No. 7,631,116, which is a continuation of application No. 09/741,829, filed on Dec. 22, 2000, now Pat. No. 6,959,346.

(51) Int. Cl.
| | |
|---|---|
| *G06F 15/00* | (2006.01) |
| *G06F 3/00* | (2006.01) |
| *H04L 29/06* | (2006.01) |
| *H04L 12/861* | (2013.01) |
| *H04L 29/08* | (2006.01) |

(52) U.S. Cl.
CPC ............... *H04L 67/42* (2013.01); *H04L 49/90* (2013.01); *H04L 49/9036* (2013.01); *H04L 63/0485* (2013.01); *H04L 67/34* (2013.01); *H04L 69/22* (2013.01); *H04L 69/329* (2013.01); *H04L 63/0428* (2013.01)

(58) Field of Classification Search
None
See application file for complete search history.

(56) References Cited

U.S. PATENT DOCUMENTS

| | | | | |
|---|---|---|---|---|
| 5,768,389 | A | * | 6/1998 | Ishii ................................. 380/30 |
| 6,141,681 | A | * | 10/2000 | Kyle ............................. 709/206 |
| 6,309,424 | B1 | * | 10/2001 | Fallon ............................. 341/51 |
| 7,600,131 | B1 | * | 10/2009 | Krishna et al. ................ 713/192 |

* cited by examiner

*Primary Examiner* — Idriss N Alrobaye
*Assistant Examiner* — Richard B Franklin
(74) *Attorney, Agent, or Firm* — Daniel Hammond

(57) ABSTRACT

A data processor and a method for processing data is disclosed. The processor has an input port for receiving packets of data to be processed. A master controller acts to analyze the packets and to provide a header including a list of processes to perform on the packet of data and an ordering thereof. The master controller is programmed with process related data relating to the overall processing function of the processor. The header is appended to the packet of data. The packet with the appended header information is stored within a buffer. A buffer controller acts to determine for each packet stored within the buffer based on the header within the packet a next processor to process the packet. The controller then provides the packet to the determined processor for processing. The processed packet is returned with some indication that the processing is done. For example, the process may be deleted from the list of processes. The buffer controller repeatedly makes a determination of a next process until there is no next process for a packet at which time it is provided to an output port.

16 Claims, 12 Drawing Sheets

METHOD AND SYSTEM FOR PACKET PROCESSING

RELATED APPLICATIONS

This application is a divisional of U.S. application Ser. No. 12/619,355, filed Nov. 16, 2009, now U.S. Pat. No. 8,639,912, issued Jan. 28, 2014, which is a continuation of U.S. application Ser. No. 11/257,525, filed Oct. 25, 2005, now U.S. Pat. No. 7,631,116, issued Dec. 8, 2009, which is a continuation of U.S. application Ser. No. 09/741,829, filed Dec. 22, 2000, now U.S. Pat. No. 6,959,346, issued Oct. 25, 2005. The entire teachings of the above applications are incorporated herein by reference.

FIELD OF THE INVENTION

The invention relates generally to processor architectures and more specifically to a flexible architecture for processing of serial data.

BACKGROUND OF THE INVENTION

Before the advent of the Internet, corporate data networks typically consisted of dedicated telecommunications lines leased from a public telephone company. Since the hardware implementation of the data networks was the exclusive property of the telephone company, a regulated utility having an absolute monopoly on the medium, security was not much of a problem; the single provider was contractually obligated to be secure, and the lack of access to the switching network from outside made it more or less resistant to external hacking and tampering.

Today, more and more enterprises are discovering the value of the Internet which is currently more widely deployed than any other single computer network in the world and is therefore readily available for use by a multinational corporate network. Since it is also a consumer-level product, Internet access can usually be provided at much lower cost than the same service provided by dedicated telephone company network. Finally, the availability of the Internet to the end user makes it possible for individuals to easily access the corporate network from home, or other remote locations.

The Internet however, is run by public companies, using open protocols, and in-band routing and control that is open to scrutiny. This environment makes it a fertile proving ground for hackers. Industrial espionage is a lucrative business today, and companies that do business on the Internet leave themselves open to attack unless they take precautions.

Several standards exist today for privacy and strong authentication on the Internet. Privacy is accomplished through encryption/decryption. Typically, encryption/decryption is performed based on algorithms which are intended to allow data transfer over an open channel between parties while maintaining the privacy of the message contents. This is accomplished by encrypting the data using an encryption key by the sender and decrypting it using a decryption key by the receiver. In symmetric key cryptography, the encryption and decryption keys are the same, whereas in public key cryptography the encryption and decryption keys are different.

Types of Encryption Algorithms

Encryption algorithms are typically classified into public-key and secret key algorithms. In secret-key algorithms, keys are secret whereas in public-key algorithms, one of the keys is known to the general public. Block ciphers are representative of the secret-key cryptosystems in use today. A block cipher takes a block of data, for example 32-128 bits, as input data and produces the same number of bits as output data. The encryption and decryption operations are performed using the key, having a length typically in the range of 56-128 bits. The encryption algorithm is designed such that it is very difficult to decrypt a message without knowing the exact value of the key.

In addition to block ciphers, Internet security protocols also rely on public-key based algorithms. A public key cryptosystem such as the Rivest, Shamir, Adelman (RSA) cryptosystem described in U.S. Pat. No. 5,144,667 issued to Pogue and Rivest uses two keys, one of which is secret—private—and the other of which is publicly available. Once someone publishes a public key, anyone may send that person a secret message encrypted using that public key; however, decryption of the message can only be accomplished by use of the private key. The advantage of such public-key encryption is private keys are not distributed to all parties of a conversation beforehand. In contrast, when symmetric encryption is used, multiple secret keys are generated, one for each party intended to receive a message, and each secret key is privately communicated. Attempting to distribute secret keys in a secure fashion results in a similar problem as that faced in sending the message using only secret-key encryption; this is typically referred to as the key distribution problem.

Key exchange is another application of public-key techniques. In a key exchange protocol, two parties can agree on a secret key even if their conversation is intercepted by a third party. The Diffie-Hellman exponential key exchange method, described in U.S. Pat. No. 4,200,770, is an example of such a protocol.

Most public-key algorithms, such as RSA and Diffie-Hellman key exchange, are based on modular exponentiation, which is the computation of $\alpha^x \mod p$. This expression means "multiply $\alpha$ by itself x times, divide the answer by p, and take the remainder." This is very computationally expensive to perform for the following reason: In order to perform this operation, many repeated multiplication operations and division operations are required. Techniques such as Montgomery's method, described in "Modular Multiplication Without Trial Division," from Mathematics of Computation, Vol. 44, No. 170 of April 1985, can reduce the number of division operations required but do not overcome this overall computational expense. In addition, for present day encryption systems the numbers used are very large (typically 1024 bits or more), so the multiply and divide instructions found in common CPUs cannot be used directly. Instead, special algorithms that break down the large multiplication operations and division operations into operations small enough to be performed on a CPU are used. These algorithms usually have a run time proportional to the square of the number of machine words involved. These factors result in multiplication of large numbers being a very slow operation. For example, a Pentium® processor can perform a 32×32-bit multiply in 10 clock cycles. A 2048-bit number can be represented in 64 32-bit words. A 2048×2048-bit multiply requires 64×64 separate 32×32-bit multiplication operations, which takes 40960 clocks on the Pentium® processor assuming no pipeline processing is performed. An exponentiation with a 2048-bit exponent requires up to 4096 multiplication operations if done in the straightforward fashion, which requires about 167 million clock cycles. If the Pentium processor is running at 166 MHZ, the entire operation requires roughly one second. Of course, the division operations add further time to the overall computation times. Clearly, a common CPU such as a Pentium cannot expect to do key generation and exchange at any great rate.

Because public-key algorithms are so computationally intensive, they are typically not used to encrypt entire messages. Instead, private-key cryptosystems are used for message transfer. The private key used to encrypt the message, called the session key, is chosen at random and encrypted using a public key. The encrypted session key and the encrypted message are then sent to the other party. The other party uses its private key to decrypt the session key, and then the message is decrypted using the session key. A different session key is used for each communication, so that if security of a session key is ever breached, only the one message encrypted therewith is accessible. This public-key/private-key method is also useful to protect continuous streams of data within communications, such as interactive terminal sessions that do not terminate in normal operation or that continue for extended periods of time. Preferably in this case, the session key is periodically changed by repeating the key exchange technique. Again, frequent changing of the session key limits the amount of data compromised when security of the session key is breached.

PRIOR ART

Network-level encryption devices, allowing access to corporate networks using a software-based solution are experiencing widespread usage. Products typically perform encryption entirely in software. The software complexity and processor speed limit throughput of such a system. Also, session key generation using public-key techniques is time consuming and is therefore undertaken only when necessary. Software does have advantages such as ease of modification and updating to encryption algorithms implemented thereby.

Other available devices use a combination of hardware and software in order to provide encryption. For example, the Entrust Sentinel X.25 encryption product uses a DES (Data encryption standard) chip produced by AMD® to perform DES symmetric-key encryption. Hardware implementations of the DES algorithm are much faster than software implementations, since DES was designed for efficient implementation in hardware and dedicated hardware solutions are known to be more efficient. A transposition that takes many central processing unit (CPU) instructions on a general purpose processor in execution of software are done using parallel special-purpose lookup tables.

The Sentinel also makes use of a Motorola DSP56000® processor to perform public-key operations. When designed, support of single-cycle multiplication by the digital signal processor (DSP) made this processor significantly faster than regular complex instruction set computers (CISC) microprocessors.

Most hardware encryption devices are severely limited in the number of algorithms that they support. For example, the AMD chip used in the Sentinel performs only DES. More recent devices from Hi/Fn can perform DES and RC4. However, other standard algorithms such as RC5 sand IDEA require use of another product.

It would be advantageous to provide a flexible processor architecture for supporting encryption and other processing of data within a data stream.

OBJECT OF THE INVENTION

In order to overcome these and other limitations of the prior art it is an object of the invention to provide a flexible processor architecture for supporting encryption and other processing of data within a data stream.

SUMMARY OF THE INVENTION

In accordance with the invention there is provided a data processor for processing data comprising an input port for receiving packets of data; at least a port for communication with each of a plurality of processors; a first processor in communication with the at least a port and for processing received data to provide a header including a list of processes to perform on the packet of data and an ordering thereof, the header stored within a packet of data to which the header relates; a buffer for storing data received from the at least a port; a buffer controller for determining based on the header within a packet a next processor of the plurality of processors to process said data packet and for providing said data packet to the at least a port for provision to the next processor.

In accordance with another embodiment of the invention there is provided a data processor for processing data comprising a buffer for storing data; a plurality of special purpose processors, each for processing data from within the buffer; a buffer controller in communication with each special purpose processor, for determining a next processor of the special purpose processors to process the data, and for providing the data to the determined next processor.

In accordance with yet another embodiment there is provided a data processor for processing a packet of data comprising an addressing network; a plurality of special purpose processors, each for processing data received via the addressing network and for providing processed data to the addressing network, the addressing network interconnecting the plurality of special purpose processors; a first processor for providing data for use in directing a packet of data through the addressing network to a plurality of processors one after another in a predetermined order, the data associated with the packet, wherein different packets are provided with different data for directing them differently through the addressing network and wherein each special purpose processor is for performing a function absent knowledge of the overall high level packet processing operation.

In accordance with another aspect of the invention there is provided a method for processing stream data comprising receiving stream data including packets of data at an input port; processing received data packets to provide for each a header including a list of processes to perform on the packet and an ordering thereof, the header stored within the packet to which the header relates; providing the packet with the associated header to a buffer for storage; for each packet within the buffer:

determining based on the header within the packet a next processor to process the packet;

providing the packet to the determined next processor for processing, and receiving the processed packet from the processor and storing it in the buffer, the stored packet including one of an indication that processing by the next processor is complete and that no processing by the next processor is required; and, when no further processes are indicated in a header of a packet, providing the packet to an output port.

In accordance with yet another aspect of the invention there is provided an architecture for processing data comprising:

a first processing element for receiving data and for formatting the data with a list of processes selected from available processes and an ordering thereof, the list of processes for being performed on the data;

further processors for performing at least one process from the available processes; and, a routing memory for providing data to processors for performing the processes according to the ordering of the listed processes.

BRIEF DESCRIPTION OF THE DRAWINGS

The invention will now be described with reference to the drawings in which like reference numerals refer to similar items and in which.

DETAILED DESCRIPTION OF THE INVENTION

In data processing it is common that data is received in a format commonly referred to as packets. A packet is a small set of data including content data and classification data. The classification data includes one or more of format data, routing data, data type information, data classification, packet grouping data, and so forth.

As each packet is received it is processed in accordance with its classification data in order to act on the data in accordance with requirements relating to that classification of data.

Figure 1:
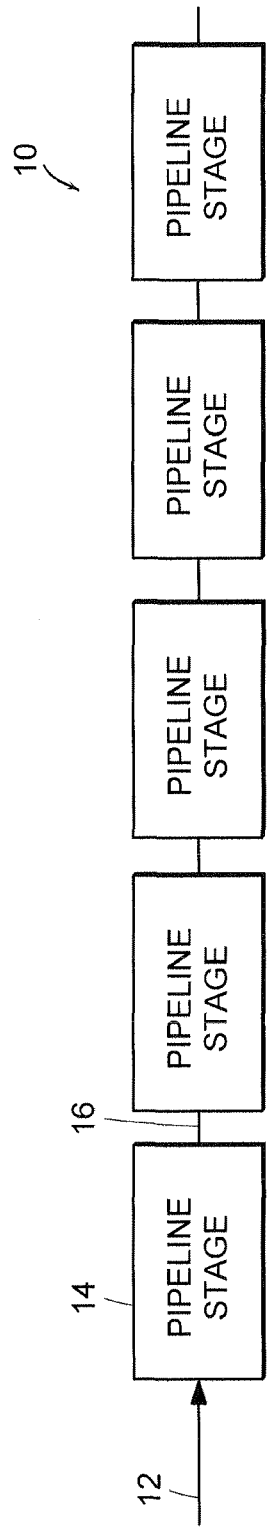
FIG. 1 is a prior art block diagram of a pipeline processor for processing of data.

An example of packet classification and processing according to the prior art is now described with reference to FIG. 1 and FIG. 2. In FIG. 1 is shown a simplified block diagram of a serial pipeline processor. The processor is shown with a single pipeline path 10 for processing data received serially at a data input port 12. The data is classified in a first stage of the pipeline 14. The classified data is then routed to an appropriate next pipeline stage through address lines 16. Examples of subsequent pipeline stages include cipher processing, routing processors, etc.

Figure 2:
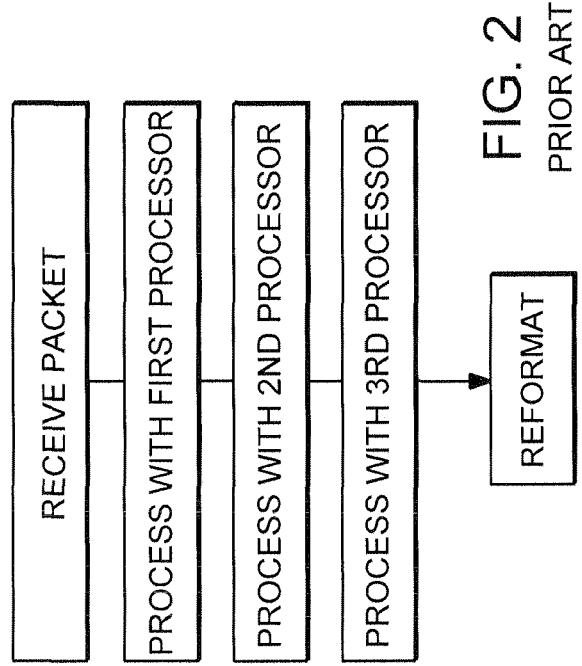
FIG. 2 is a simplified flow diagram of a method for processing a packet using the pipeline processor of FIG. 1.

Referring to FIG. 2, a simplified flow diagram of a method of packet processing for a packet received at input port 12 is shown. The packet is received. It is classified to determine a packet format. Here, the format is encrypted so the encrypted packet data is provided to a cipher processor for decryption. Once decrypted, the plain text is stored in a data buffer from which it is transferred to a destination process such as a communication port of a personal computer.

Though the packet processor of FIGS. 1 and 2 is efficient and makes use of parallel hardware based processors that are typically optimised for performing a specific task, the processor architecture is extremely inflexible. Each pipeline stage requires knowledge of all immediately subsequent pipeline stages in order to direct partially processed packets. Also, some pipeline stages are fully utilised while others are under utilised. Thus, efficiency is compromised. Finally, each packet follows a same path with some simple switching to ensure that packets are not processed when there is no need to do so.

Figure 3:
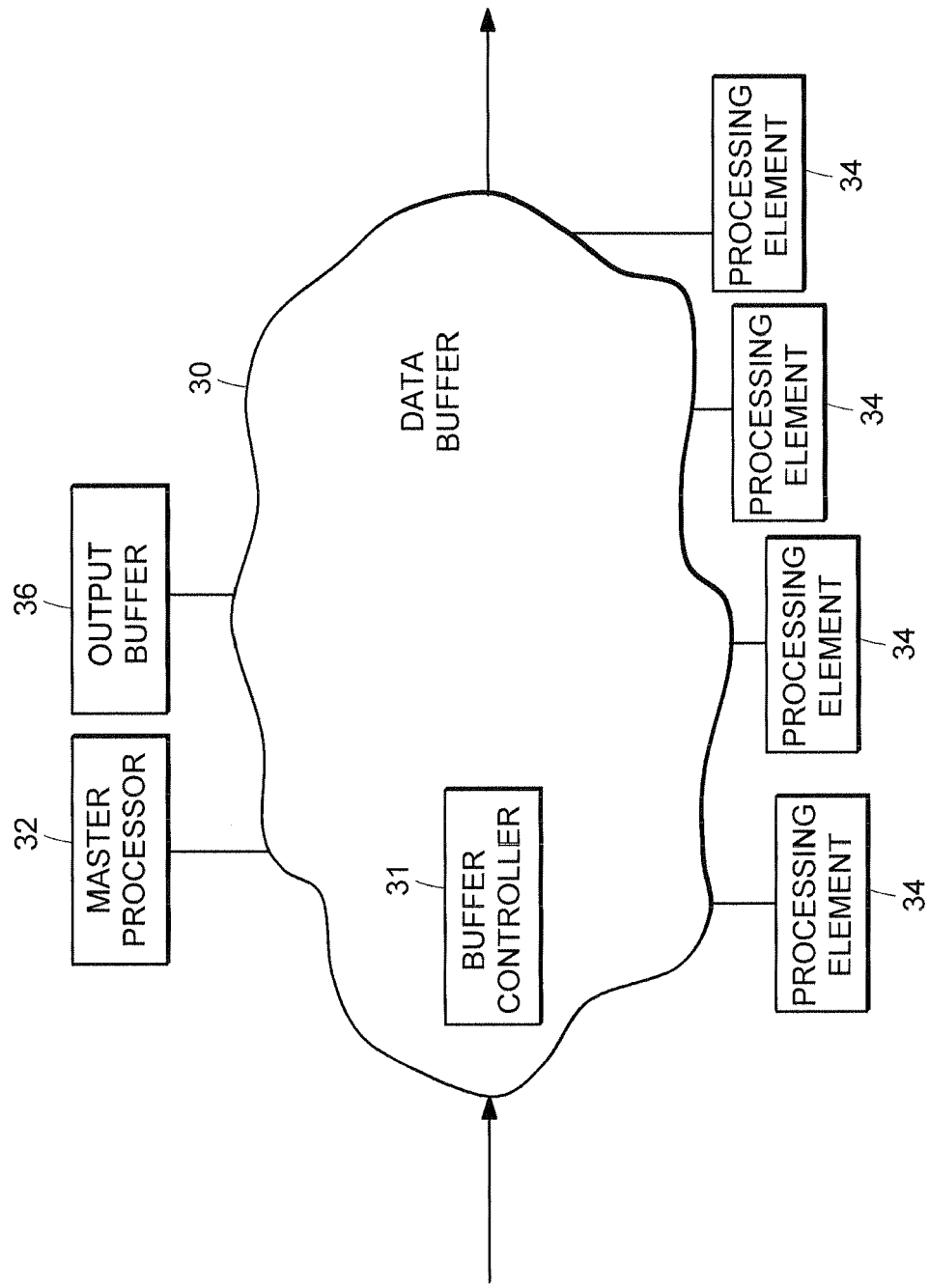
FIG. 3 is, a simplified architectural diagram of an embodiment of the present invention.

Referring to FIG. 3, a simplified architectural diagram of an embodiment of the present invention is shown. Here a data buffer 30 is shown disposed central to a packet processor. A buffer controller 31 determines based on the header within a packet, a next processor of a plurality of processors to process data packets. The buffer controller 31 provides the data packet to a port for provision to the next processor. A master processor 32 acts to format each packet in order to insert a header therein indicative of processes required for processing that packet. The master processor 32 is programmable and understands the processing of packets at a high level. Once the packet is reformatted, it is returned to the data buffer 30 from which it is routed to a processing element 34 for performing the first listed function. For example, in the example of FIG. 2, the first function is determining a format of the packet. The packet format is determined and for each determined format a number of possible functions may be added or removed from the list within the header. For example, an encrypted packet may have the function cipher added to it along with some form of key identifier. The key identifier and the packet is then provided to a cipher processor from the buffer 30. In the cipher processor the packet is decrypted and the decrypted packet is returned to the buffer 30. The buffer 30 continues to provide the packet to processors as long as further functions remain within the header. When the header is empty, the packet is transferred to an output port for storage, for example in a received data buffer 36. Alternatively, a last function indicates the provision of the data to a data output port.

Because of the central data buffer of FIG. 3, the number and type of processors is easily varied, upgraded, expanded and so forth. Each time a new function is supported, the master processor is reprogrammed to know of the new function and appropriate packets for which to list the process.

Advantageously, only the master processor inserts functions within a header. As such, only the master processor needs to capture data relating to packet processing and only the master processor requires reprogramming when the processing method or capabilities are changed.

Figure 4:
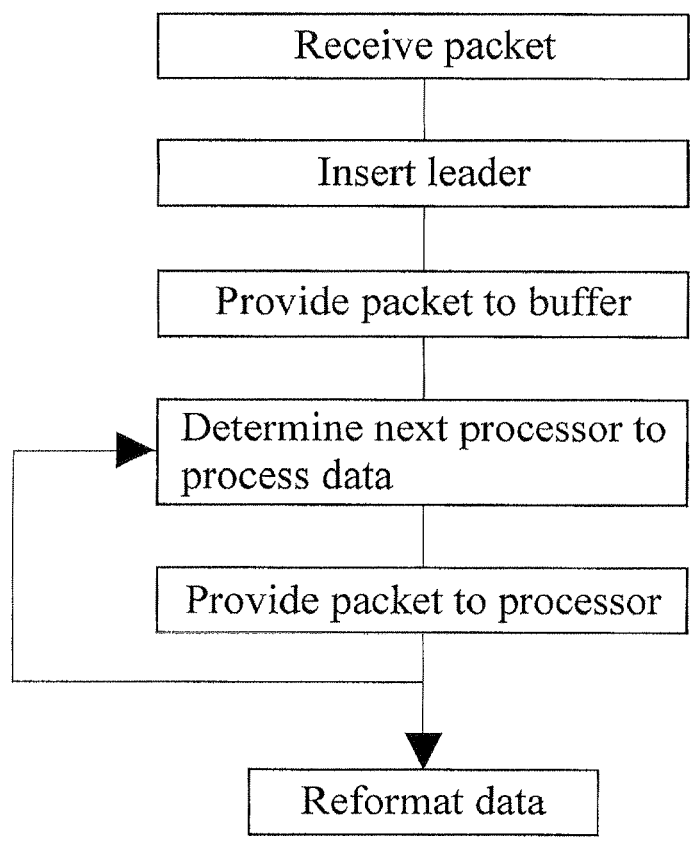
FIG. 4 is a simplified flow diagram of a method according to the invention.

Referring to FIG. 4, a simplified flow diagram of a method according to the invention is shown. Here, a packet is received. The master processor inserts a header indicative of classification, cipher processing, combining packets, and providing the combined data to the data output port. The buffer then receives the formatted packet and provides it to a classification processor that strips out classification data within the packet and replaces it with a known classification code. The packet is then returned to the buffer. The returned packet has the classification step removed therefrom either by removing the function from the header or by indicating the function as completed. The classified packet is then provided to a processor for ciphering. The cipher processor decrypts the packet data and returns the clear text packet to the buffer. The clear text packet is now provided to a combining processor that detects the packet classification information to determine if it is part of a segmented larger packet and combines it with those segments of the larger packet that are already in the combiner. When the larger packet is complete, it is returned to the buffer and then provided to the output data port.

As is clear to one of skill in the art, the use of such an architecture greatly facilitates updating the processor capabilities, programming, and power. For example, a new cipher processor is easily added. The new resource is identified to the buffer as a cipher processor to allow the buffer to send packets having a cipher function required to the new processor. Similarly, a classification processor can be upgraded or changed without effecting the processor.

Also, the core processor according to the inventive architecture comprises a buffer and a master processor. The master processor is programmable to allow for upgradable and flexible packet processing. The buffer is capable of recognising and interfacing with a plurality of different dedicated processors. Of course, when desired, the dedicated processors are included within a same integrated processor.

Figure 5:
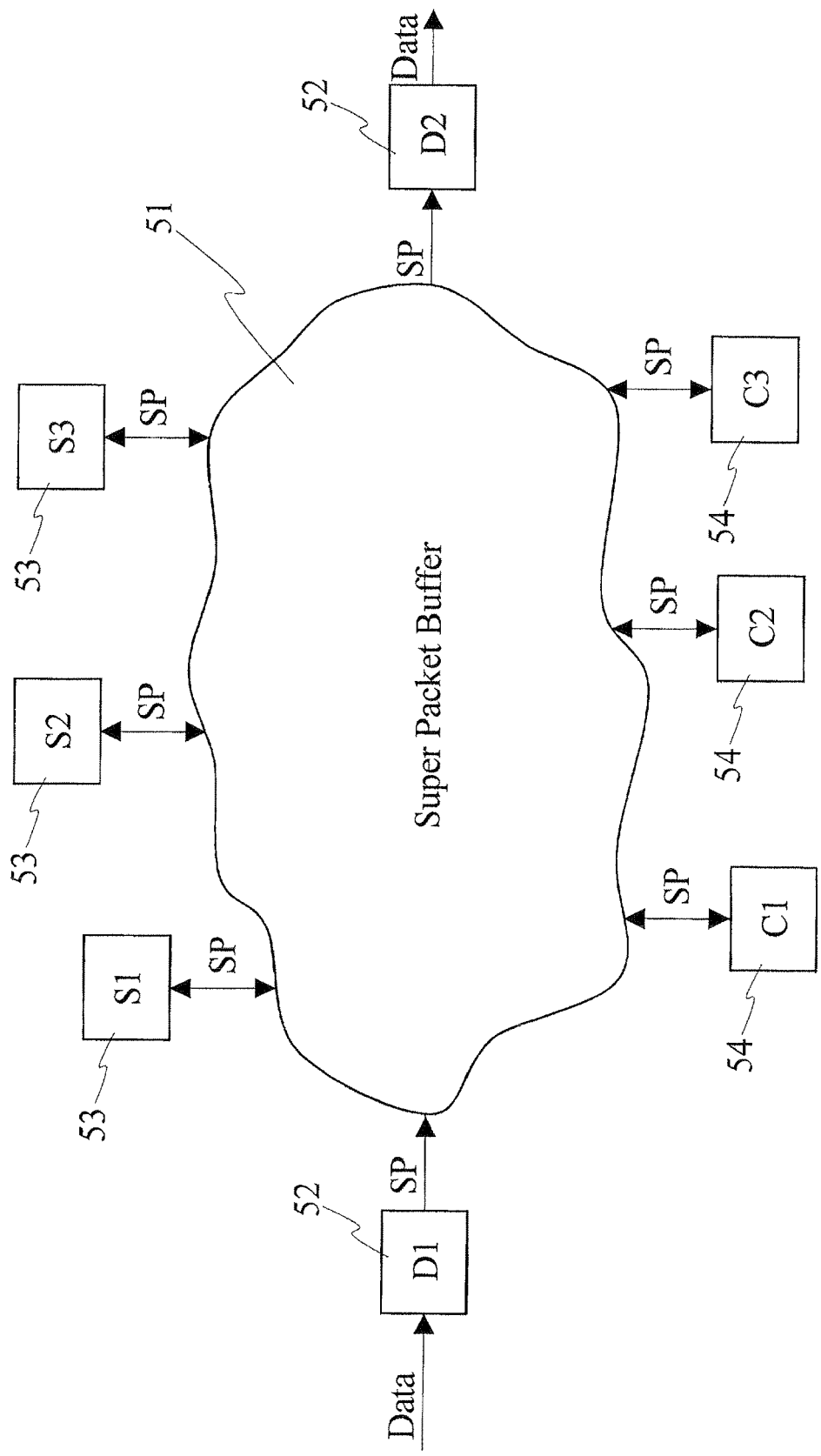
FIG. 5 is a simplified block diagram of a processor architecture according to the invention.

Referring to FIG. 5, a simplified architectural diagram of a processor according to the invention is shown. A super packet buffer 51 is in communication with a plurality of data elements 52. The data elements 52 are for providing data to the super packet buffer 51 and for receiving data from the super packet buffer 51. Though the data element D1 is shown for providing and the data element D2 is shown receiving data, data elements 52 optionally support bidirectional communication with the super packet buffer (SPB) 51.

The SPB is also in communication with a plurality of processors. Processors 53 provide data processing including determining further processing required for a data packet. Processors 54 are referred to as client processors and perform data processing on packets that are received. Typically client processors 54 are dedicated to a single form of processing that is self contained and can be performed on a packet in isolation. Cipher processing is one such process. Thus, a DES encryption engine typically forms a client processor for receiving data, for encrypting the data, and for returning the encrypted data to the SPB.

Each communication port is typically controlled by a driver process in execution within the SPB 51. For example, a driver process for a DES encryption engine would typically strip the header from a packet and provide the data to be encrypted by the processor along with key data in the form of a key or of a key identifier. The DES processor then processes the data and returns the processed data to the driver process which reinserts the header data, indicates the DES processing as completed, and passes the packet back to the SPB 51. The use of driver processes allows for use of non-proprietary processing elements—legacy processors—for performing dedicated tasks. The use of driver processes also allows for system maintainability and upgradability.

Figure 6:
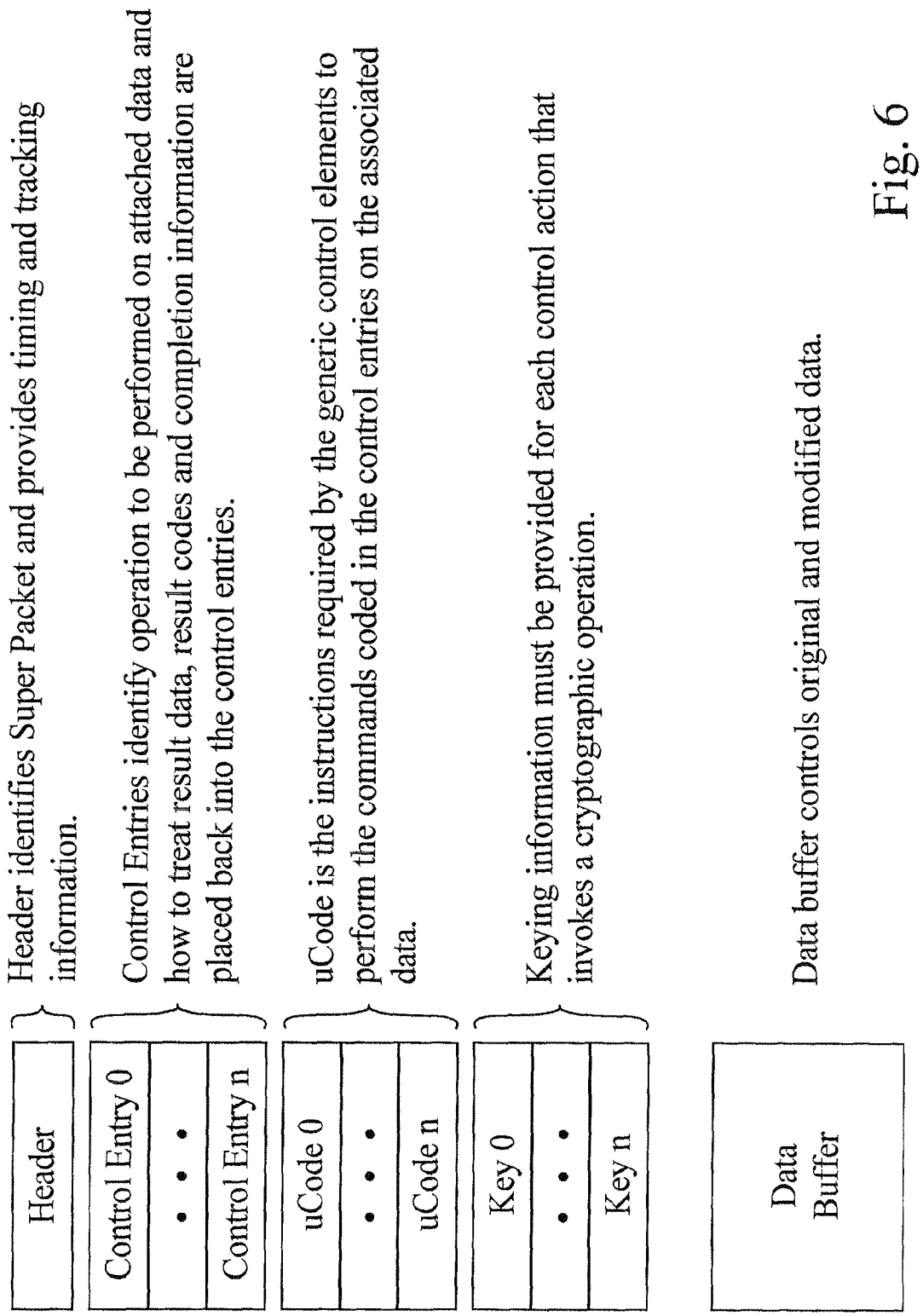
FIG. 6 is a data structure diagram for a super packet.

Referring to FIG. 6, an exemplary super packet data structure is shown. The super packet comprises a header, an ordered list of operations, data relating to the operations, key data, and packet data. The header provides data used for identifying the super packet and for tracking of same. Optionally, the header also includes auditing information for use in monitoring performance, debugging, security audits, and other functions wherein a log is useful.

The control entries include a list of processes—functions—required for the data within the data buffer. These processes are generally listed in a generic fashion such that the super packet buffer routes the super packet to any of a number of available processors for performing said function. Some functions require data, which is stored either following each function identifier or in a separate set of fields within a super packet. For example, a cipher processor may require an indication of which of encrypt/decrypt to perform. Key data is stored in a subsequent set of fields and typically identifies keys by identifier instead of storing within the actual super packets. Finally, the data to be processed is included within the super packet.

Figure 7:
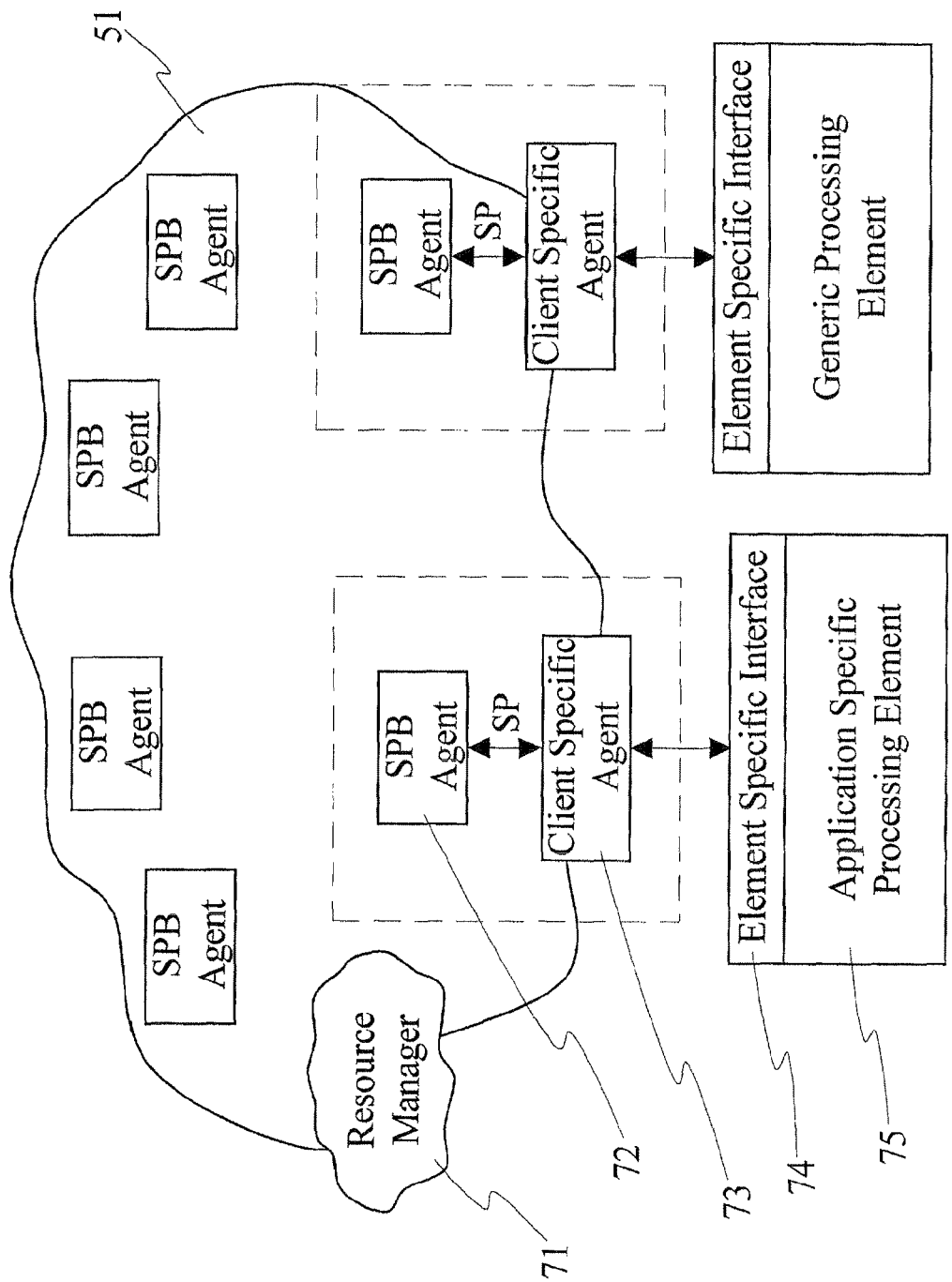
FIG. 7 is a simplified block diagram of a processor architecture according to the invention.

Referring to FIG. 7, an architectural diagram of another embodiment of the invention is shown. Here, a resource manager 71 maintains information on resource availability and so forth while agents 72 in execution within the super packet buffer 51 operate to provide super packets to processors 75 in accordance with their headers. Client specific agents 73 act as part of the driver process and communicate with the agents 72 to determine data that will be suitably processed by the client 75. Once the client 75 is determined, the remainder of the driver process 74 acts to format the data for receipt by the client 75.

Figure 8:
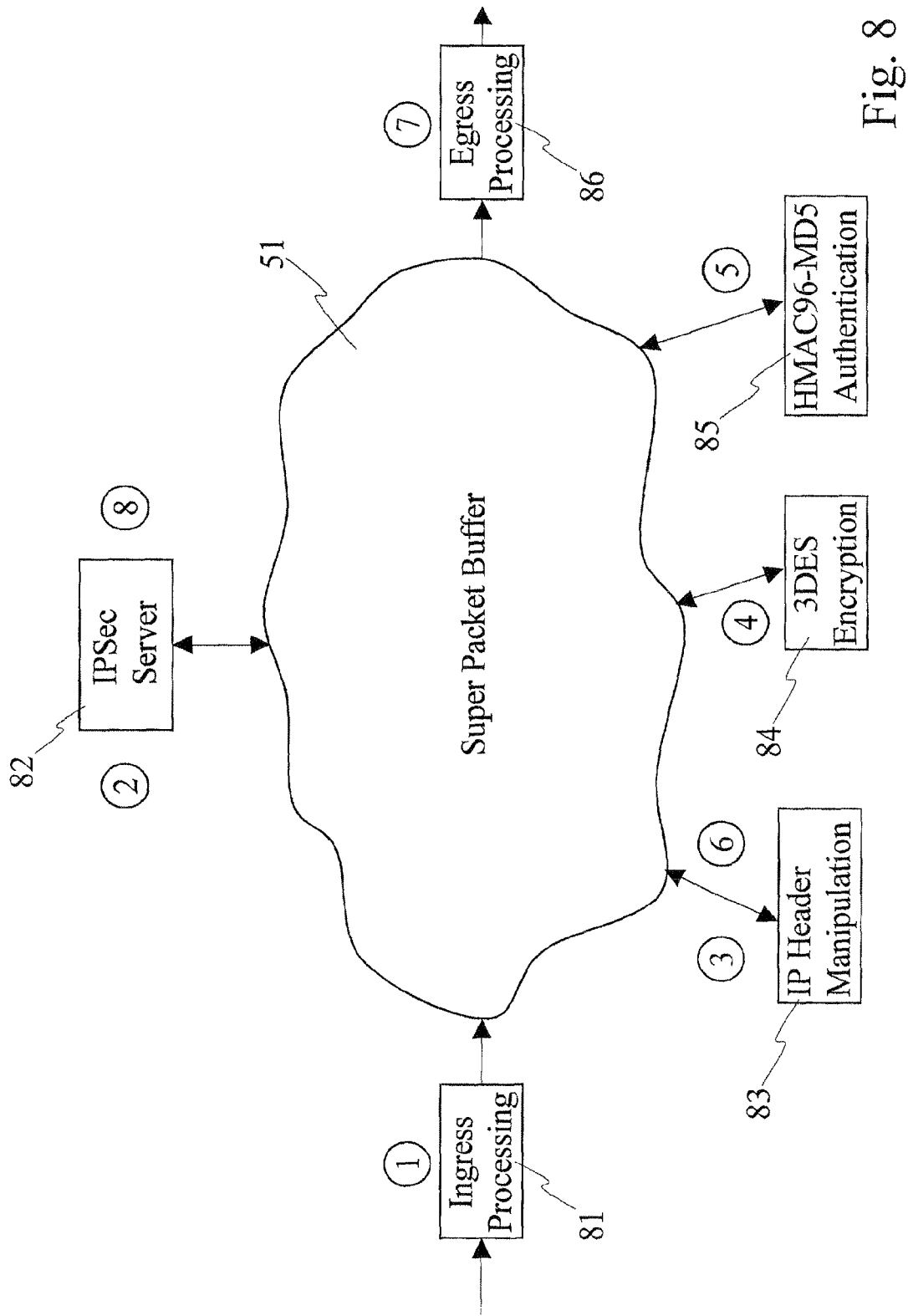
FIG. 8 is a simplified block diagram of a processor architecture according to the invention.

Referring to FIG. 8, a simplified architectural diagram of a processor for use in supporting Internet protocol security (IPSEC) processing is shown. The process of data reaching a processor having an architecture according to the invention is shown in FIGS. 9*a*-9*d*. The data element 81 performs ingress processing of data prior to providing the data in the form of a super packet of data to the super packet buffer 51. The super packet of data includes a header indicative of a single process—that of the server processor 82 for processing the data packet. The super packet is then provided to the IPSEC server 82 where it is converted into a super packet more indicative of correct processing. The IPSEC server 82 is the only processor that has knowledge of the overall process being performed on each incoming data packet. All other processors perform their single function absent knowledge of how it fits into the global scheme.

Figure 9A:
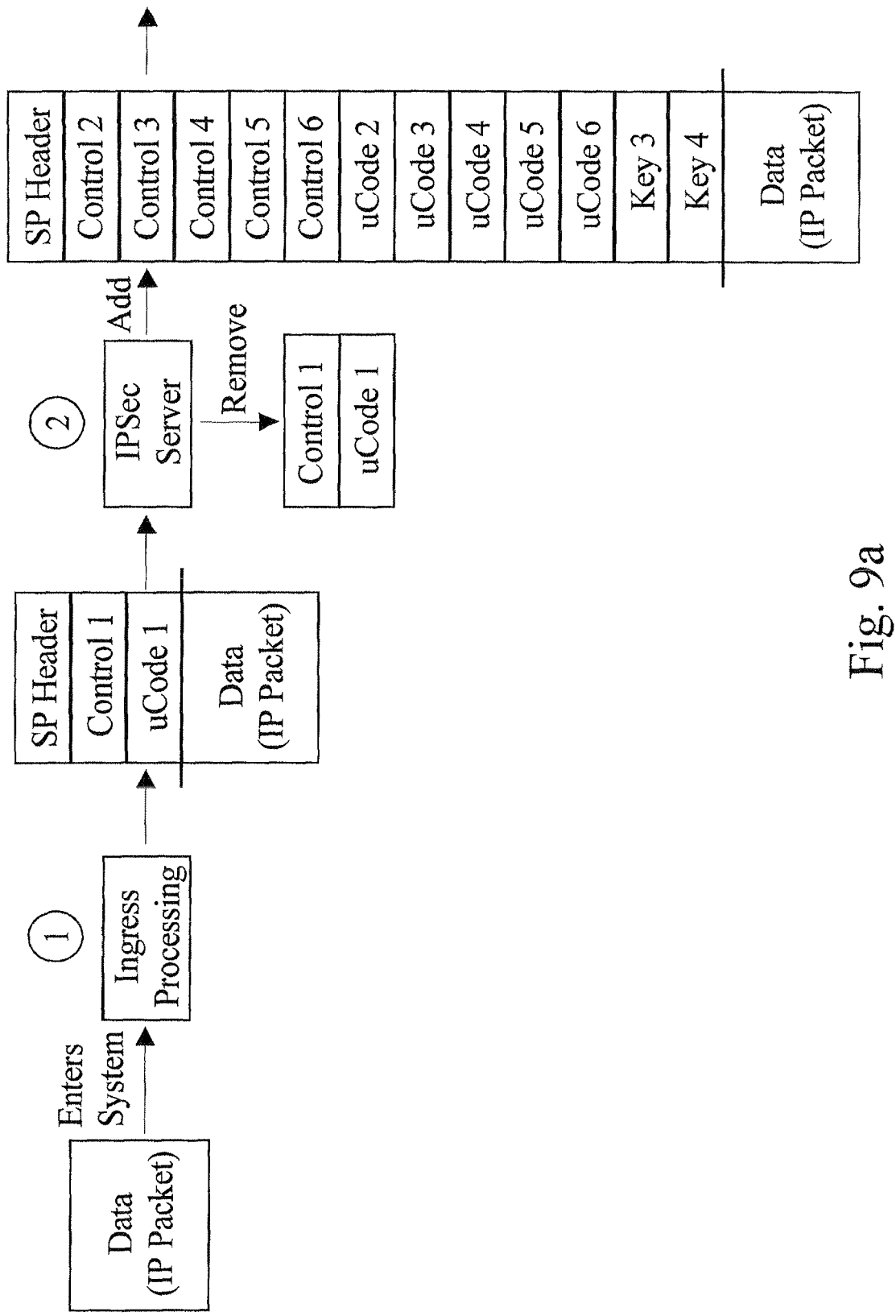
FIGS. 9a-9d is a data structure diagram for a super packet throughout a processing operation being performed thereon; and, FIG. 10 is a simplified block diagram of a processor array for use with an architecture according to the invention.
Figure 9B:
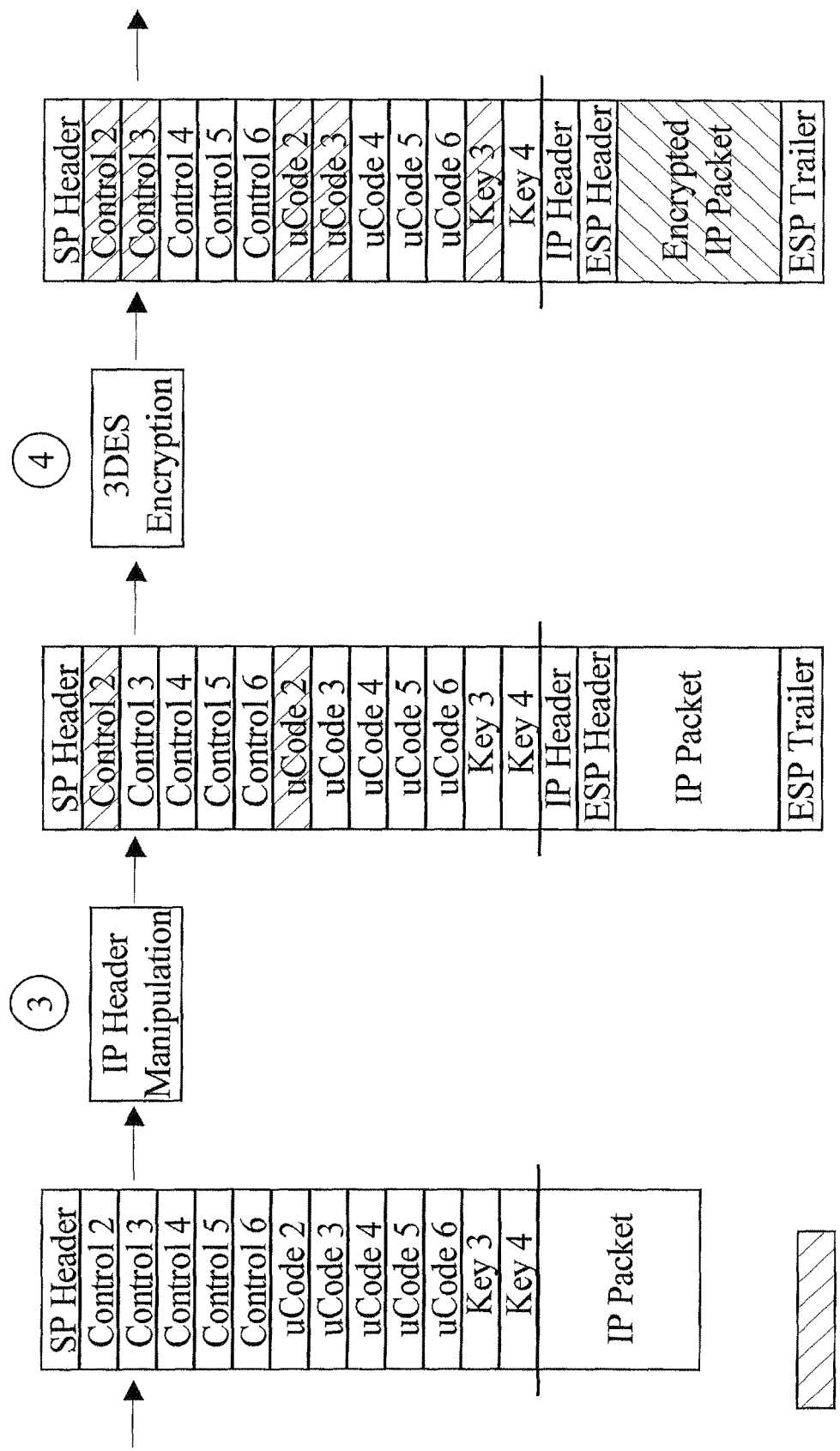
Figure 9C:
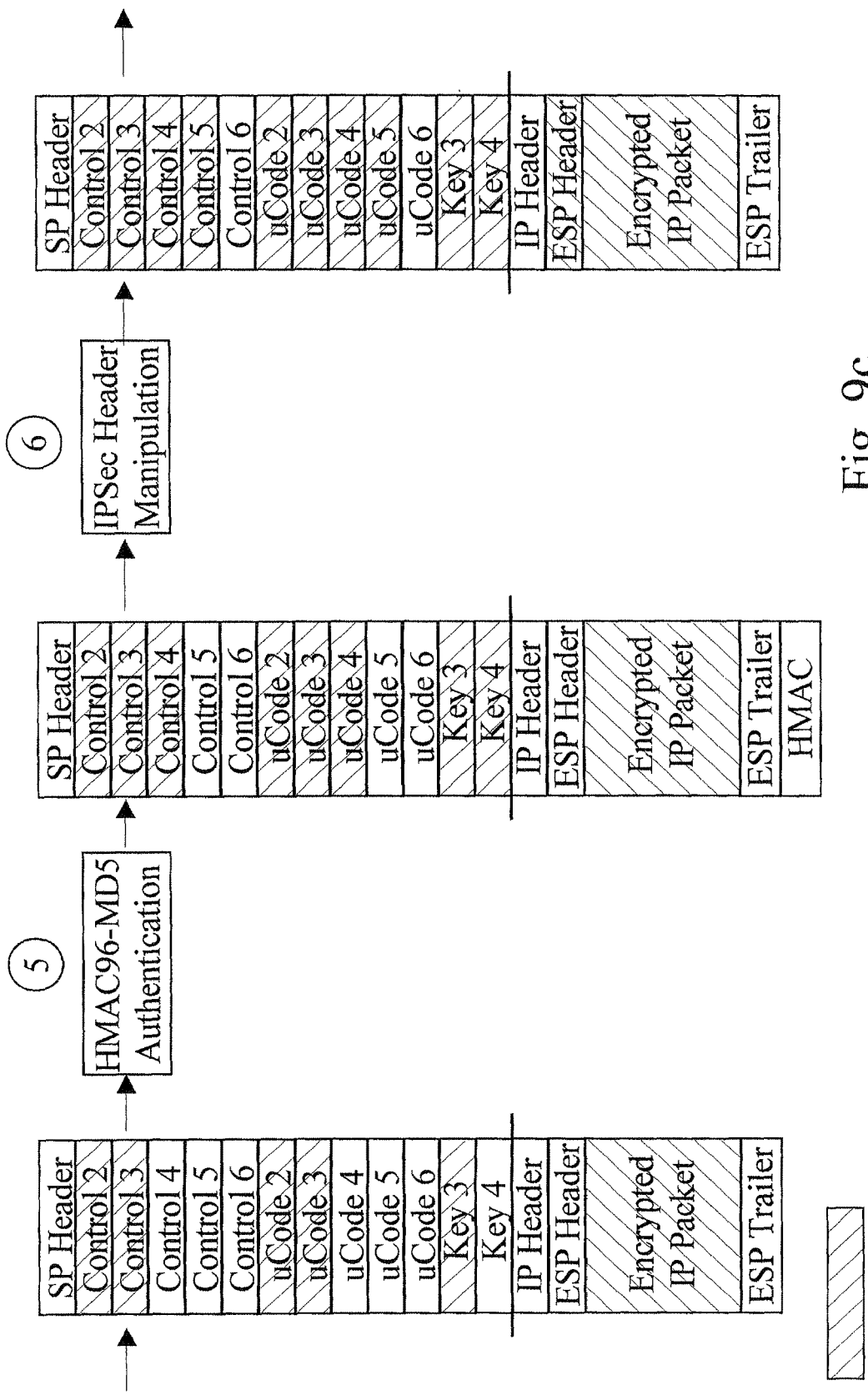

The super packet is returned to the super packet buffer 51 from the server processor 82. Once there, the super packet is provided to the client processor 83 for IP header manipulation. The data within the data buffer is shown (FIG. 9*b*) with IP header information and encapsulated security payload (ESP) header information therein. The process, control 2, is then marked as performed and the super packet is returned to the super packet buffer 51. The next process is that process indicated by control 3, 3DES Encryption. Client 84 provides this functionality. The super packet is provided to client 84 where, as shown in FIG. 9*b* encryption is performed and the function control 3 is marked as having been performed. The next function to be performed is HMAC96-MD5 Authentication. Client 85 performs this function. The super packet is provided to the client 85 where, as shown in FIG. 9*c*, Hashed Message Authentication Code (HMAC) is added to the data within the buffer. The super packet is returned to the super packet buffer 51 once the function is marked as having been performed.

Figure 9D:
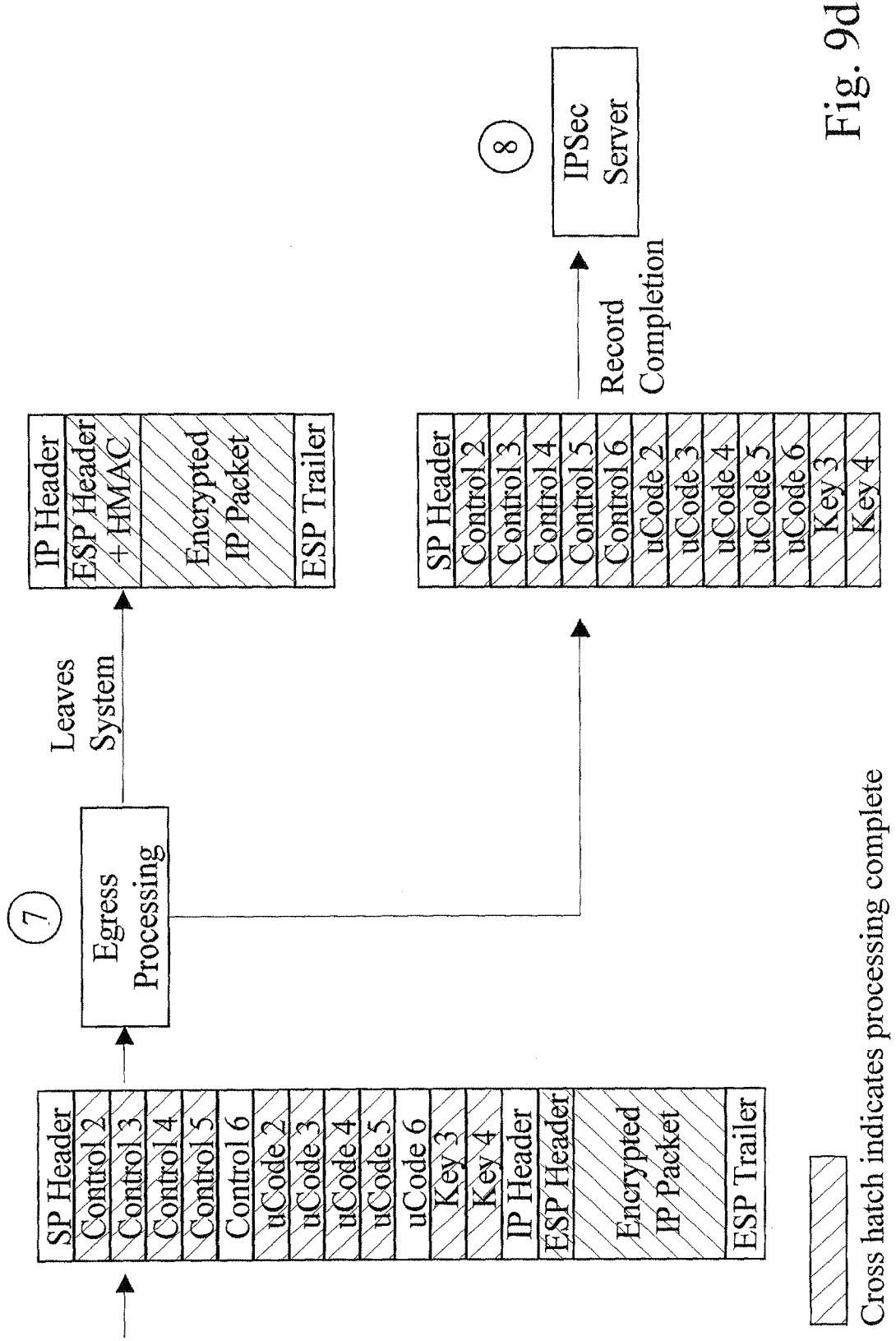

The next function is control 5, which requires IPSEC Header Manipulation. The client 83 is capable of performing this function as well as the function of control 2. The super packet is provided to the client 83 where the data is reformatted as shown in FIG. 9*c*. Once again the function control 5 is marked as having been performed and the super packet is returned to the super packet buffer. Finally, the remaining function relates to egress processing performed by data element 86 and the results of which are shown in FIG. 9*d*. The super packet is stripped of its header leaving a processed packet of data for communication. Optionally, the stripped header information is provided to the server for use in real-time monitoring of performance and logging of performance data.

As is evident to those of skill in the art, only the server is provided with data relating to the overall process. Replacement of the cipher processor client 84 with a new version of the cipher processor has virtually no impact on the overall architecture or the system. Though the server 82 needs to know steps for carrying out the process, these steps are high level and the server 82 need not understand anything relating to 3DES, IP Header manipulation or HMAC. Advantageously, instead of replacing a client processor a new client processor is simply added to the system to provide more than one client processor for a single task.

Though the architecture is described with reference to a modular embodiment, the entire processor architecture may be implemented within a single integrated circuit. Preferably, the integrated circuit provides an interface for external processors to allow for future dedicated modules and application specific data processing client modules.

Of course, when a single group of processing functions is performed sufficiently many times in a same order, it is preferable to group those functions into a single client processor. For example, encryption is a plurality of different functions that are grouped. When an amount of IPSEC packet processing required is equivalent to the entire throughput of each client processor required, an IPSEC packet processor including the same functional elements arranged in a pipeline is preferably used as a client processor to the super packet buffer. In this way, much of the SPB overhead is eliminated. Of course, the flexibility to use the client processors for other processing operations is lost so, when resource usage is less than a maximum resource usage, it is often preferable to maintain a more flexible architecture.

Alternatively, a single pipeline processor is provided with a plurality of input ports for providing access to the complete pipeline or to a single, underutilised, processor forming part of the pipeline processor. Of course, such an embodiment adds significant complexity to the pipeline processor and therefore is considered less desirable than using separate client processors or a dedicated function pipeline processor as described above.

Figure 10:
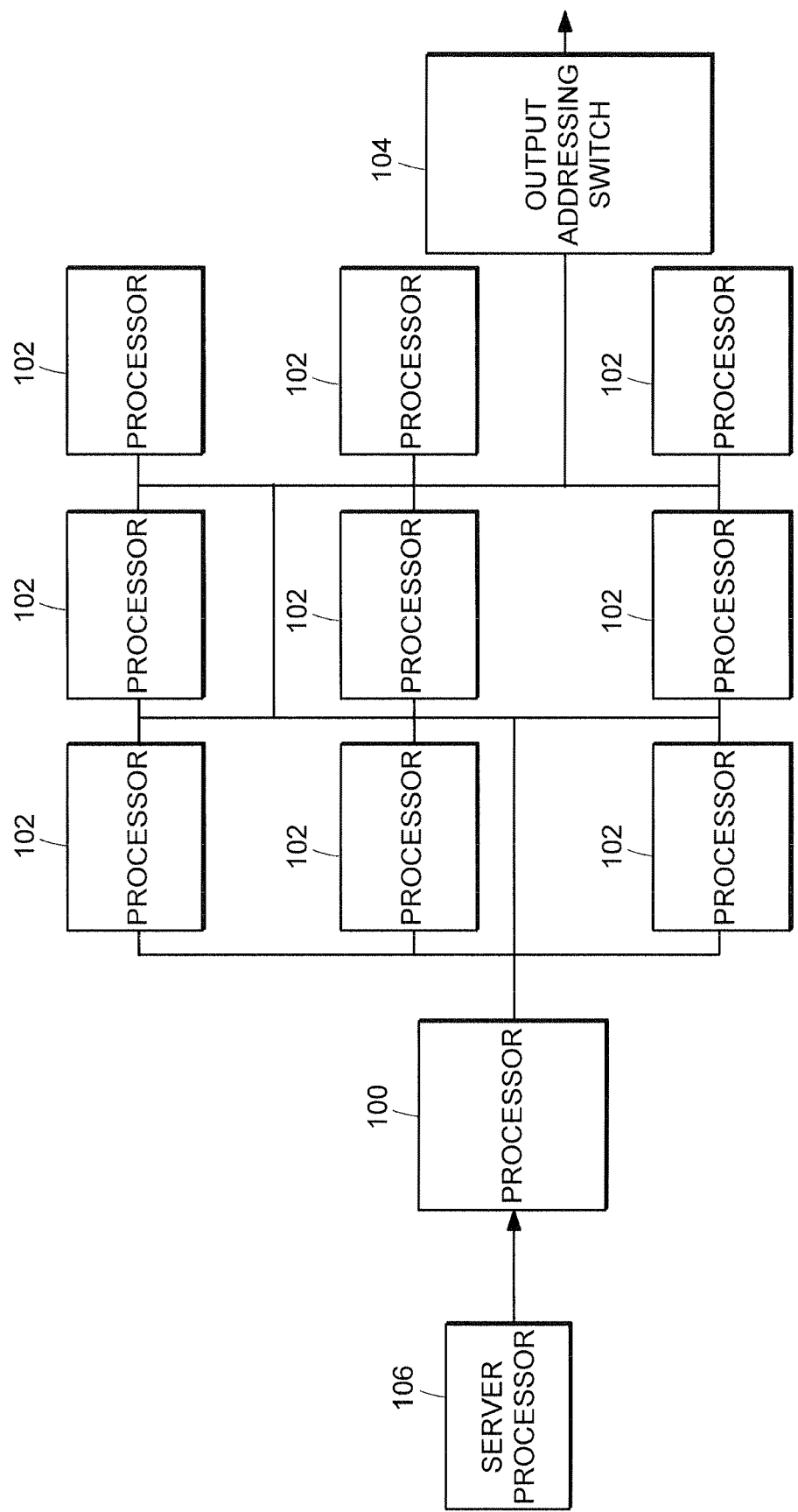

In accordance with another embodiment of the invention as shown in FIG. 10, the server processor 106 stores within the header switching information for use in switching the super packet within an array of processors 106. A packet is directed from the server processor 106 to a first processor 100 for processing. The header and the packet data are separated so as to not affect processing of the data. When the data is processed, header data is provided to an output addressing switch 104 and the super packet data is automatically routed in a pseudo pipelined fashion to a subsequent processing element. Such an embodiment reduces flexibility, expandability, functionality and so forth while adding to the overall hardware complexity. That said, the performance of such an embodiment is likely superior to the more flexible architecture described above and in many applications the lack of flexibility and so forth is not considered a great disadvantage.

Alternatively, since the super packet includes data relating to individual processes, it is possible to encode therein executable code for execution on the processor. As such a general purpose processor is provided and when functions outside the scope of the special purpose client processors is required, executable code and the super packet is provided to the general purpose processor for processing thereof. Further alternatively, only a pointer to the code is provided to reduce the overall super packet size.

In accordance with the diagrams, the invention is particularly well suited to encryption functions wherein secret keys are guarded in single function modules to enhance overall system security. The super packet buffer directs packets to different modules as necessary to perform processing thereof without compromising secret keys stored within those modules.

Numerous other embodiments may be envisaged without departing from the spirit or scope of the invention.

What is claimed is:

1. An integrated circuit comprising:
a data processor disposed on the integrated circuit, the data processor comprising a plurality of processors each operable to process data;
an input port operable to receive packets of data;
at least one port operable to communicate with each of the plurality of processors;
a first processor, also disposed on the integrated circuit, in communication with the at least one port and operable to process received data to insert a header including a list of processes to perform on at least one of the packets of received data and an ordering of the processes specified in the header, the header stored within a packet of data to which the header relates;
a buffer that is operable to store data from the at least one port; and
a buffer controller of the buffer, the buffer controller operable to:
determine, based on the header, a destination processor of the plurality of processors to process the data packet; and
to provide the data packet to the at least one port for provision to the destination processor.

2. The integrated circuit of claim 1 wherein the first processor is operable to provide executable code to the destination processor, the executable code being executable to process an associated packet.

3. The integrated circuit of claim 1 wherein the first processor is operable to provide an indication of executable code to the destination processor, the executable code being executable to process an associated packet.

4. The integrated circuit of claim 1 wherein the buffer controller is operable to determine the destination processor from a plurality of available processors each of which is operable to process the data packet.

5. The integrated circuit of claim 1 wherein the plurality of processors includes a plurality of special purpose processors.

6. The integrated circuit of claim 5 wherein the plurality of special purpose processors includes at least a cryptographic processor having secret keys stored therein and inaccessible from outside the cryptographic processor.

7. The integrated circuit of claim 5 wherein the plurality of special purpose processors includes a plurality of processors for performing aspects of network security protocol processing in order to support at least a network security protocol.

8. The integrated circuit of claim 7 wherein the network security protocol is IPSec.

9. A method comprising:
receiving, at an input port of an integrated circuit, a plurality of data packets;
generating, by a first processor of the integrated circuit in communication with at least one port operable to communicate with each of a plurality of processors forming a data processor disposed on the integrated circuit along with the first processor, a header including a list of processes to perform on at least one of the plurality of data packets and an ordering of the processes specified in the header;
storing, at a buffer of the integrated circuit, the header within a packet of data to which the header relates;
determining based on the header, by a buffer controller of the buffer, a destination processor of a plurality of processors to process the data packet; and
providing, by the buffer controller, the data packet to the at least one port for provision to the destination processor.

10. The method of claim 9, further comprising providing, by the first processor, executable code to the destination processor, the executable code being executable to process an associated packet.

11. The method of claim 9, further comprising providing, by the first processor, an indication of executable code to the destination processor, the executable code being executable to process an associated packet.

12. The method of claim 9, further comprising determining, by the buffer controller, the destination processor from a plurality of available processors each of which is operable to process the data packet.

13. The method of claim 9 wherein the plurality of processors includes a plurality of special purpose processors.

14. The method of claim 13 wherein the plurality of special purpose processors includes at least a cryptographic processor having secret keys stored therein and inaccessible from outside the cryptographic processor.

15. The method of claim 13 wherein the plurality of special purpose processors includes a plurality of processors for performing aspects of network security protocol processing in order to support at least a network security protocol.

16. The method of claim 15 wherein the network security protocol is IPSec.

* * * * *